UNITED STATES PATENT OFFICE.

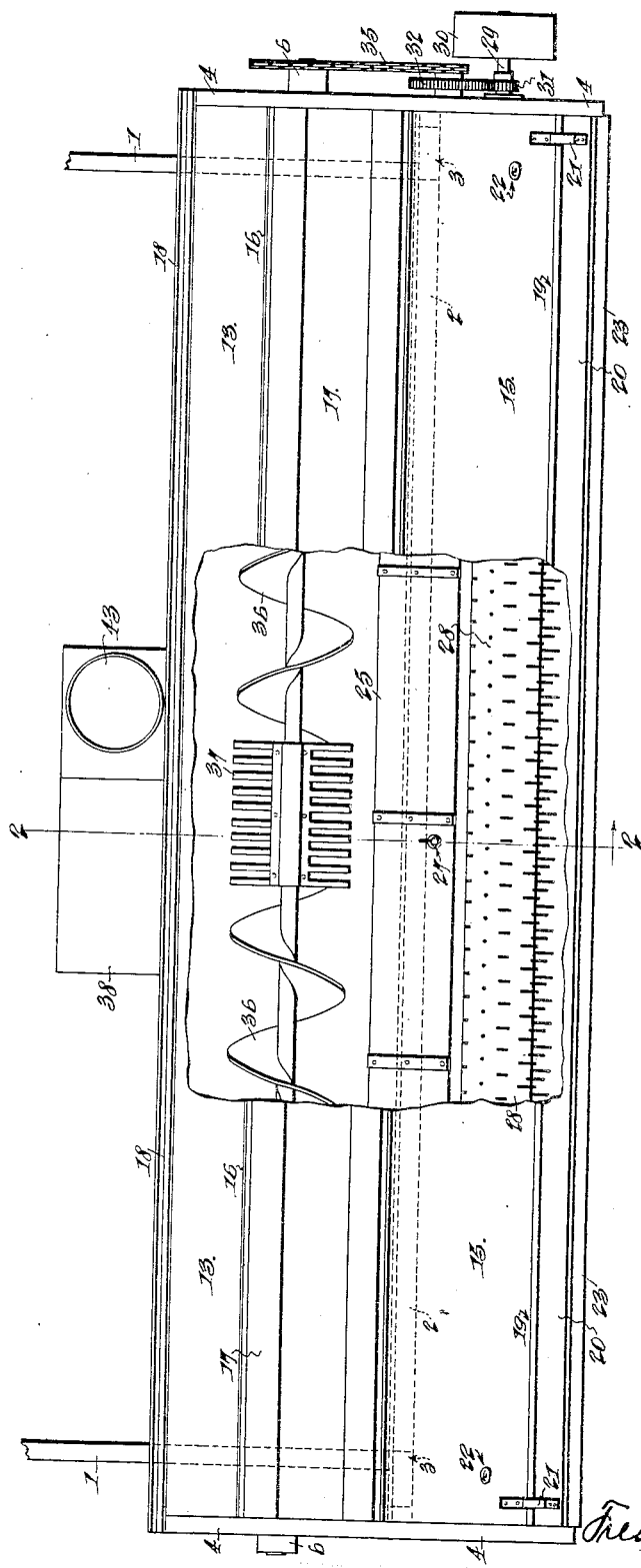

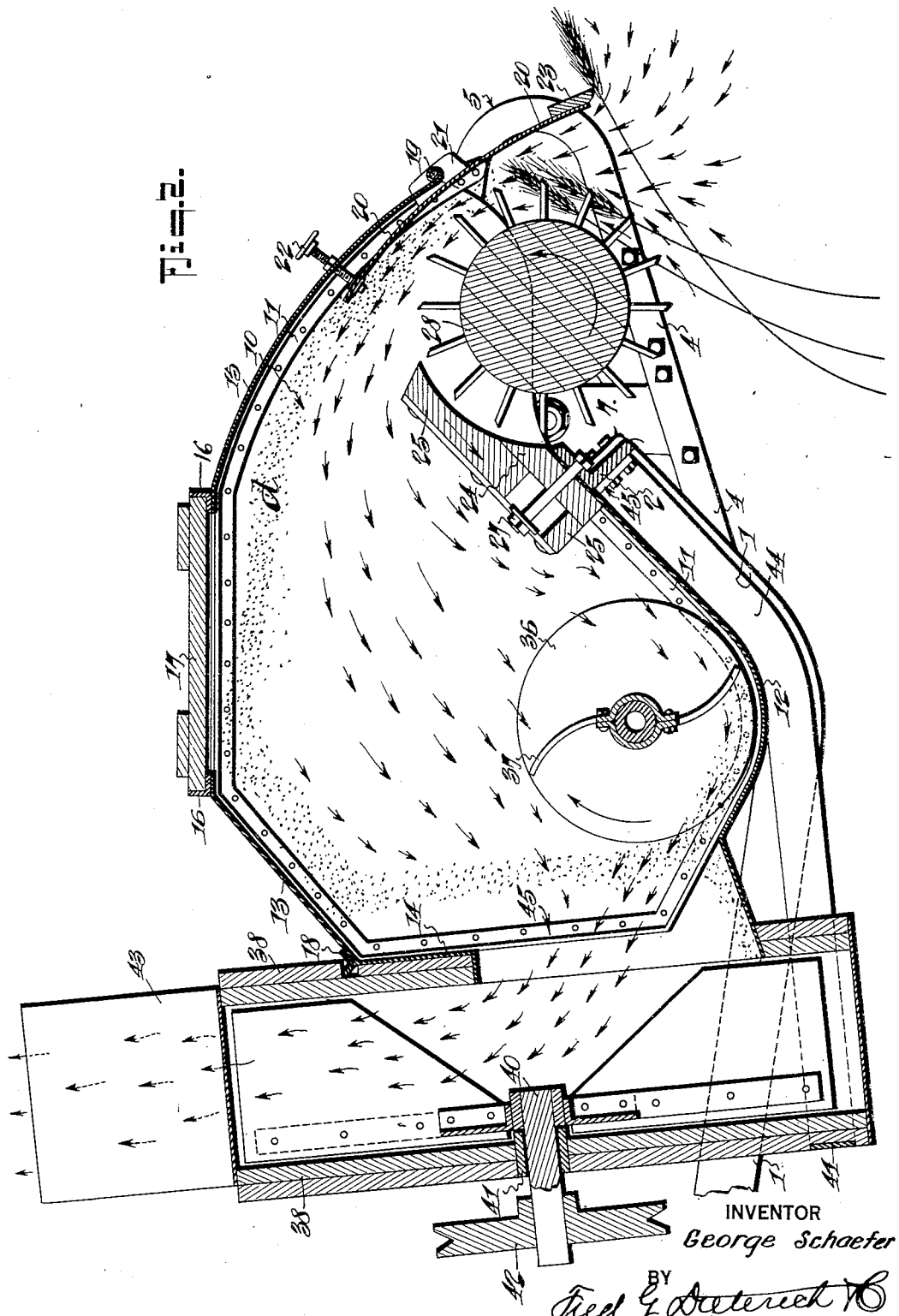

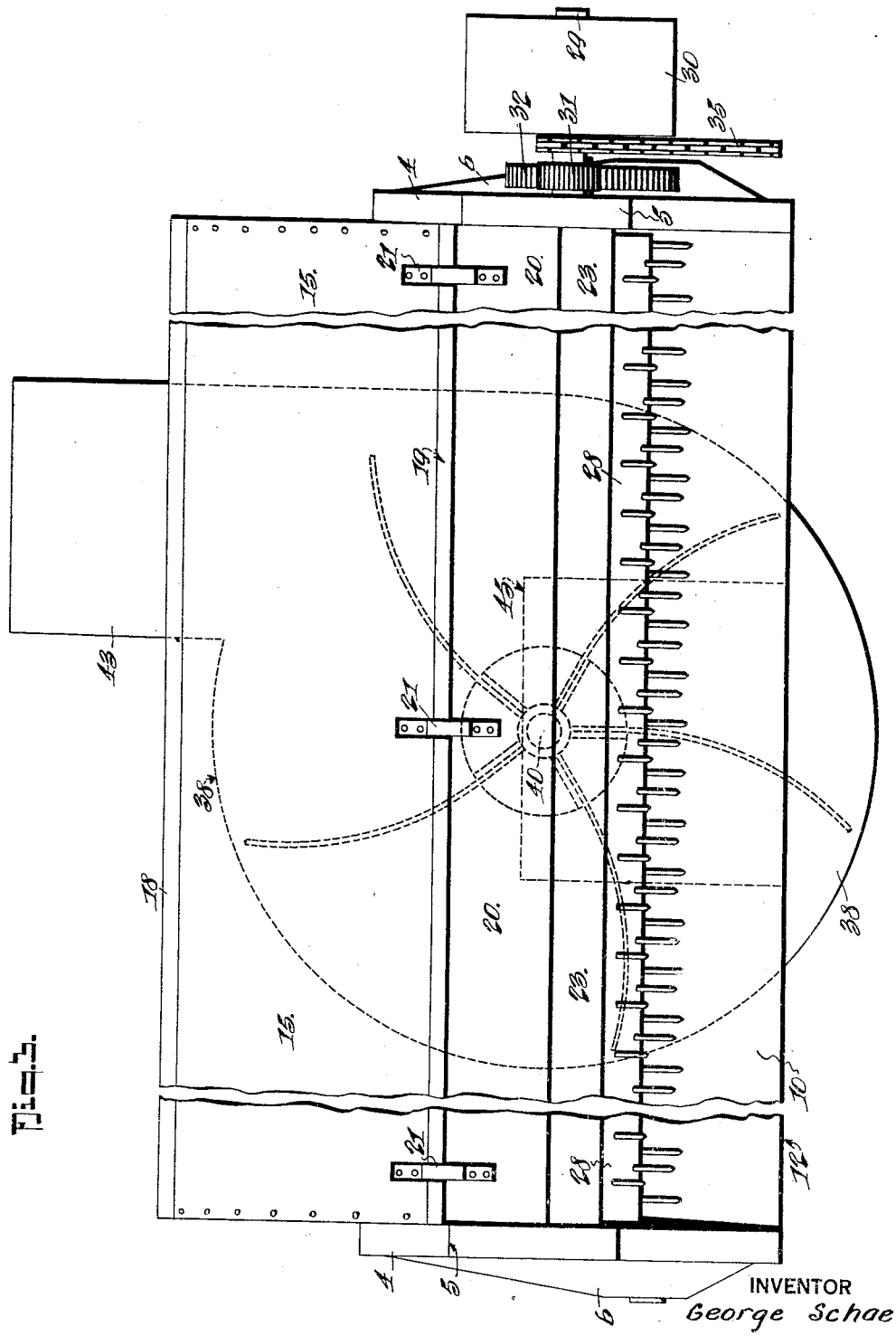

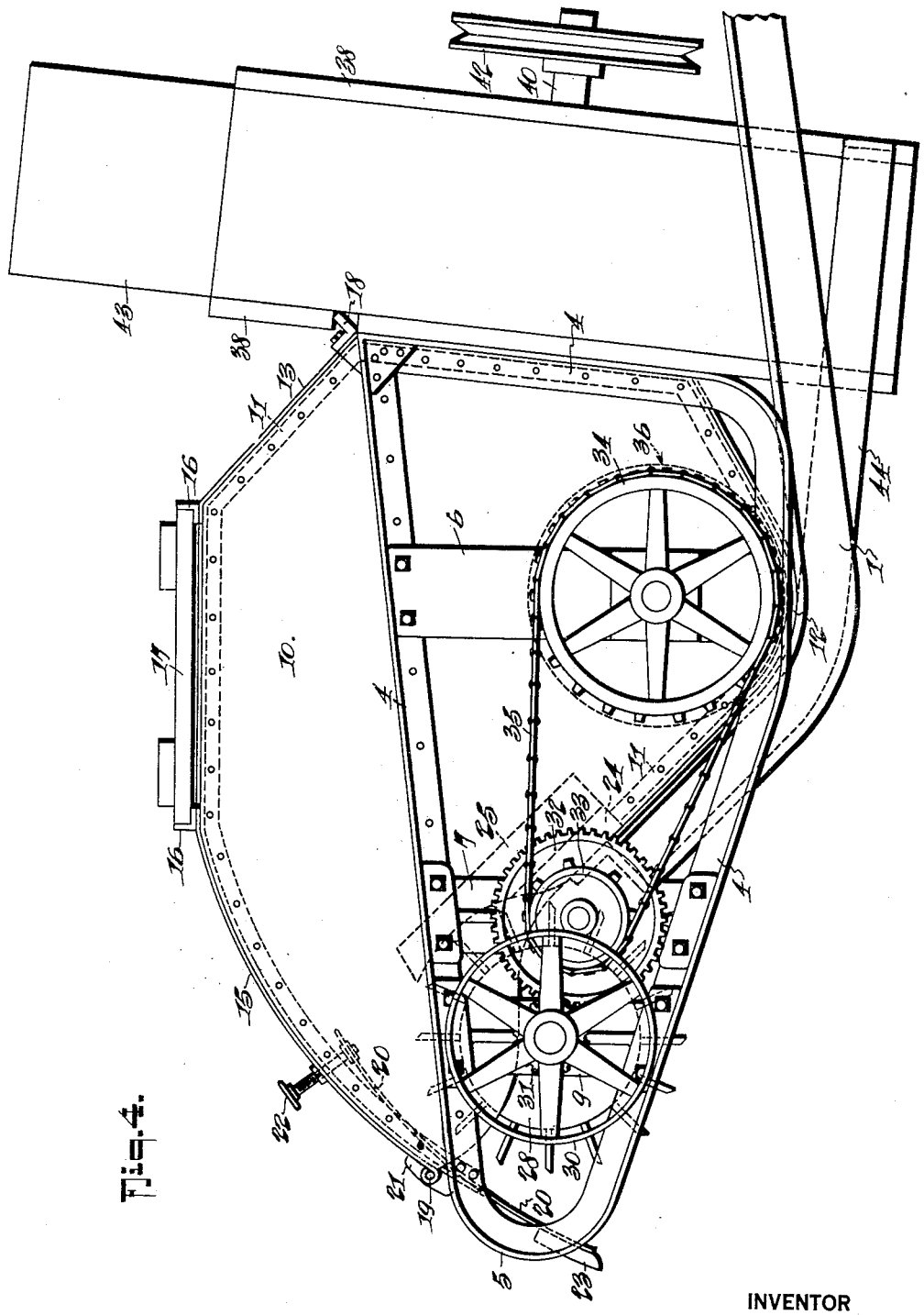

GEORGE SCHAEFER, OF RUSSELL, KANSAS.

GRAIN-GATHERING MECHANISM.

1,370,919.　　　　Specification of Letters Patent.　　Patented Mar. 8, 1921.

Application filed March 15, 1920. Serial No. 365,991.

*To all whom it may concern:*

Be it known that I, GEORGE SCHAEFER, a citizen of the United States, residing at Russell, in the county of Russell and State of Kansas, have invented a new and Improved Grain-Gathering Mechanism, of which the following is a specification.

This invention is a mechanism which has been especially designed for use in connection with standing grain threshers of the character disclosed in my copending application filed on the 21st day of April, 1920, Serial No. 375,457, and it has for one of its objects to provide a simple, efficient and durable mechanism of such construction that the parts thereof coöperate in such manner that practically all the grain which is removed from the stalk will be saved, thus eliminating the waste of grain that has been experienced heretofore when this method of threshing machine was used.

Another object of the invention is to provide a stripping cylinder pan coöperating with the stripping cylinder and the suction-blower in such manner that the air drawn in by the blower in the delivery of the grain and straw to the thresher proper will pass directly in front of and over the top of the revolving toothed stripping cylinder in such manner that the straw lying flat on the ground will be raised and subjected to the action of the stripping cylinder; also, the grain which has been dislodged by the action of the teeth anywhere about the periphery of the toothed cylinder will, by the action of the air, be drawn into the pan where it is saved.

Again, it is an object of the invention to provide a mechanism of such construction and design that when the pan is lowered, as when operating on wheat and other grain which lies flat, the content of the pan is prevented from coming into contact with the downwardly traveling teeth of the stripping cylinder, thereby preventing waste, which heretofore has not been overcome.

Another object of the invention is to provide a simple, efficient, durable and inexpensive means of manufacture which will insure the successful operation of the stripping cylinder in threshing all kinds of grain under any and all conditions.

A further object of the invention is to provide a construction in which provision is made so that in the event of an obstruction being encountered, which would tend to cause that part of the stripping cylinder to come into contact with the cylinder teeth, breakage of either the cylinder teeth or the pan at this place will be eliminated.

In the accompanying drawings, which illustrate a preferred embodiment of the invention:

Figure 1 is a top plan view of an apparatus embodying the invention.

Fig. 2 is a vertical cross section of the same taken substantially on the line 2—2 of Fig. 1, the action of the air from the blower being indicated by the arrows and the movement of the grain being indicated by dots.

Fig. 3 is a front elevation of the pan (parts being broken away) and indicating the location or position of the blower to the rear.

Fig. 4 is an end elevation of the pan at the side at which the operating mechanism is located.

1 represents the arms which carry the stripping cylinder, the pan, and the blower, constituting the grain gathering mechanism.

The arms 1 are preferably of angle-iron construction and are pivotally mounted on the threshing machine (not shown), so as to allow of raising and lowering the grain gathering mechanism for the purpose of handling grain of various heights.

Secured at 3 to the front ends of the arms 1 is the main supporting angle-iron 2.

4 indicates the end frames, the fronts of which are rounded at 5 to form the nose. The brackets 6, 7 and 9 are secured to the frames 4. (See Fig. 4.) The brackets 7 may be secured as well to the ends of the main supporting angles 2 and thus add rigidity and strength to the structure.

The end plates 10 of the pan are secured to the frames 4 and are also secured to the pan end angle-irons 11, to which the plates 10 are riveted or otherwise suitably fastened.

The pan bottom 12 is concaved to form a recess for the double screw conveyer 36 and it extends to and is secured between the main supporting angle 2 and a cross board 24, as best shown in Fig. 2 of the drawings. 13 designates the back top wall of the pan which is inclined downwardly from the cover opening to where it is secured to the top cross channel iron 18 that is also fastened to the blower box 38, the back wall 14 of the pan extending downwardly to the entrance 45 of the blower. The front wall 15 of the grain gathering pan, directly over the stripping cylinder 28, is oval in form and is so designed for the purpose of directing the grain which is dislodged by the action of the stripping cylinder to the rear part of the pan, as indicated by the dots $d$, whence, when the grain comes in contact with the right and left spiral conveyer 36 Figs. 1 and 2, and is by it conveyed, together with the straw, to the central portion from whence it is pitched into the blower casing 38 by the fingers 37. The portion of the pan 13 serves to direct downwardly the grain from the stripping cylinder and the conveyer spiral.

The top of the pan is provided with a longitudinally extending opening having, on either side, an angle iron 16 serving to make more rigid this section of the pan and also serving as a means for keeping in position the lid or cover 17.

The termination of the front portion of the pan (see Fig. 2) always remains a certain distance from the upwardly traveling cylinder teeth, as has been found best in practice, and in order to provide for grain, in its various conditions, an adjustable front 20 is provided, which can be raised or lowered or extended to or from the cylinder as the case demands.

At 19 is provided a longitudinally extending rod extending the entire length of the pan, and at intervals (see Figs. 1 and 2) slots in the top sheet 15 are provided through which extends the supporting straps 21, which are attached to the adjustable front part 20, thus supporting it in position.

Any suitable adjusting means 22 may be provided for holding the adjustable front part 20 in fixed positions of adjustment or that part may be left floating, as it were, by omission of the adjusting means 22, if desired.

It will be noticed from Figs. 2 and 3, that the plate constituting the adjustable front part 20 is provided at the bottom with a longitudinally extending plank 23 which tends to strengthen this part and absorb vibration.

At the termination of the front part of the pan bottom, adjacent to the supporting angle-iron 2, is arranged a longitudinal plank 24, the front edge of which conforms to the periphery of the stripping cylinder, as indicated in Fig. 2.

On top of the plank 24 is slidably attached, by bolts 27, or in any other suitable way, a second plank 25 which extends well up to the top of the cylinder and is adjustable in the direction of the arrow shown on the cross section of the plank in Fig. 2.

One of the objects of the plank construction is to cause the air taken in by the blower to pass around in front of the stripping cylinder, thus eliminating air being taken in back of the cylinder, which would be of no use in aiding the stripping cylinder.

The adjusting qualities of the plank 25 make possible the satisfactory arrangement of the plank for any position that the pan may be operated in.

A further object of the plank construction is to provide a means that may be maintained in a position very close to the cylinder teeth, and in the event of an obstruction causing this part of the pan to come in contact with the cylinder teeth, breakage of either cylinder teeth or pan, at this point, will be eliminated.

Another object of the plank construction is to provide a simple and inexpensive way of rigidly constructing this part of the apparatus so as to absorb vibration, thereby extending the length of this part of the machine.

A still further object of the plank construction is to build high this part of the pan in order that, when the pan is lowered, as when operating in wheat or other grain which lie flat, the contents of the pan is prevented from coming in contact with the downwardly traveling teeth, thus preventing waste, which heretofore has not been overcome.

28 is the toothed stripping cylinder, which may be of any approved construction, the shaft 29 of which is journaled in bearings in the brackets 9 and is provided with a drive pulley 30, to which power may be applied in any desired way.

The shaft 29 is also provided with a pinion 31 which meshes with an idler gear 32 that carries a sprocket 33, over which and over a second sprocket 34, a drive chain 35 passes, the sprocket 34 being mounted on the shaft of the double screw conveyer 36.

The conveyer 36 is so pitched that the material is fed from the ends of the pan toward the center where it is engaged by the pitching or tossing fingers 37 on the conveyer shaft and, by these fingers, is thrown into the blower box 38, through the opening 45, which function of the fingers 37 is, of course, aided by the suction of the blower.

The blower may be of any approved construction and, in general, consists of a box or housing 38, carrying the bearing 41 for the shaft 40 on which the fan 39 is mounted, a pulley 42 being provided through the medium of which power may be applied to turn the blower crank.

The blower is supported from the main angle-iron 2, by a U strap 44 which is secured to the blower box and embraces the lower end of the same and is also fastened at 45 to the main angle-iron 2.

The outlet 43 of the blower, through which the grain and straw is discharged from the stripping mechanism, is clearly indicated in the drawings and may be connected up, in any desired way, with the duct (not shown) to the threshing mechanism.

It will be observed from Fig. 3 that the blower is arranged in the center of the pan in order that the suction created by the same will be equally distributed along the stripping cylinder from one end to the other.

It is important from the standpoint of long life and ease of manufacture, that such construction of the pan be employed that will insure rigidity and simplicity, hence formed angles are freely resorted to, as will be noticed from Figs. 2 and 4 of the drawings.

The ends 10 of the pan are preferably riveted to the angles 11 and frames 4, which angles are, in turn, riveted to the sides, top and bottom of the pan.

As before intimated, the stripping cylinder 28 may be made from any suitable material and may have any number of teeth, such as may be found best in practice.

The bearings for the shaft ends of the spiral conveyer 36 may be made of seasoned oak, this material being cheap, highly efficient and durable.

The operating means 30, 31, 32, 33, 34 and 35, may be of any suitable material and, by its arrangement the pan can be quickly and cheaply made and assembled as a unit, which is an important feature to be considered in manufacture.

By observing Fig. 2, it will be seen that the position of the spiral conveyer 36 is somewhat below that of the stripping cylinder, thus providing capacity for grain and straw in extreme amounts; also a good size space at the rear of the pan between the conveyer and the entrance to the blower is provided, made possible by this special construction of the pan, which provides ample space for moving straw in extreme amounts, such as is needed in down grain, when the stripping cylinder gathers up straw in quantities.

It will also be noted that the top of the pan is arranged considerably above the stripping cylinder and conveyer in order to provide plenty of space for the grain and straw, also in order that full advantage of the suction created by the blower may be realized.

This arrangement has been found quite satisfactory and successful in operation. By this construction of pan, grain which has been cut in the ordinary manner, may be satisfactorily threshed by lowering the pan to the proper height from the ground and pitching the grain and straw to be threshed on the ground directly in front of the stripping cylinder. The grain and straw is picked up and thrown to the rear of the pan and thence conveyed to the blower, which, in turn, delivers the mass to the threshing machine proper.

While the drawings illustrate the preferred embodiment of my invention, I wish it understood that the invention is not to be considered as limited to the specific details of construction shown and described, as the same may be varied and modified to suit conditions as they arise in practice, without departing from the spirit of the invention or the scope of the appended claims.

What I claim is:

1. In a grain gathering apparatus, a grain pan having a conveyer pocket or depression in its bottom and having a mouth in its front, and a discharge opening in its back, a stripping cylinder in the mouth of the pan, a conveyer in the depression of the pan for concentrating the material adjacent to the discharge opening, a suction blower having its entrance in communication with the pan discharge opening, and means for operating the cylinder, conveyer and blower.

2. In a grain gathering apparatus, a grain pan having a conveyer pocket or depression in its bottom and having a mouth in its front, and a discharge opening in its back, a stripping cylinder in the mouth of the pan, a conveyer in the depression of the pan for concentrating the material adjacent to the discharge opening, a suction blower having its entrance in communication with the pan discharge opening, and means for operating the cylinder, conveyer and blower, said conveyer being located at a lower level than the stripping cylinder.

3. In a grain gathering apparatus, a grain pan having a conveyer pocket or depression in its bottom and having a mouth in its front, and a discharge opening in its back, a stripping cylinder in the mouth of the pan, a conveyer in the depression of the pan for concentrating the material adjacent to the discharge opening, a suction blower having its entrance in communication with the pan discharge opening, and means for operating the cylinder, conveyer and blower, said conveyer being located a substantial distance from the discharge opening to leave a straw and grain collecting space between the conveyer and the back of the pan.

4. In a grain gathering apparatus, a grain pan having a conveyer pocket or depression in its bottom and having a mouth in its front, and a discharge opening in its back, a stripping cylinder in the mouth of the pan, a conveyer in the depression of the pan for concentrating the material adjacent to the discharge opening, a suction blower having its entrance in communication with the pan discharge opening, and means for operating the cylinder, conveyer and blower, said conveyer being located at a lower level than the stripping cylinder, said conveyer being located a substantial distance from the discharge opening to leave a straw and grain collecting space between the conveyer and the back of the pan.

5. In a grain gathering apparatus, a grain pan having a conveyer pocket or depression in its bottom and having a mouth in its front, and a discharge opening in its back, a stripping cylinder in the mouth of the pan, a conveyer in the depression of the pan for concentrating the material adjacent to the discharge opening, a suction blower having its entrance in communication with the pan discharge opening, and means for operating the cylinder, conveyer and blower, the top of the pan over the stripping cylinder being oval and extending to a higher level than that of the top of the cylinder, the conveyer and the discharge opening.

6. In a grain gathering apparatus, a grain pan having a conveyer pocket or depression in its bottom and having a mouth in its front, and a discharge opening in its back, a stripping cylinder in the mouth of the pan, a conveyer in the depression of the pan for concentrating the material adjacent to the discharge opening, a suction blower having its entrance in communication with the pan discharge opening, and means for operating the cylinder, conveyer and blower, the top of the opening at the rear being downwardly and rearwardly inclined to form a baffle for directing the grain toward the conveyer.

7. In a grain gathering apparatus, a grain pan having a conveyer pocket or depression in its bottom and having a mouth in its front, and a discharge opening in its back, a stripping cylinder in the mouth of the pan, a conveyer in the depression of the pan for concentrating the material adjacent to the discharge opening, a suction blower having its entrance in communication with the pan discharge opening, and means for operating the cylinder, conveyer and blower, the top of the pan over the stripping cylinder being oval and extending to a higher level than that of the top of the cylinder, the conveyer and the discharge opening, the top of the pan at the rear being downwardly and rearwardly inclined to form a baffle for directing the grain toward the conveyer.

8. In a grain gathering apparatus, a grain pan having a conveyer pocket or depression in its bottom and having a mouth in its front, and a discharge opening in its back, a stripping cylinder in the mouth of the pan, a conveyer in the depression of the pan for concentrating the material adjacent to the discharge opening, a suction blower having its entrance in communication with the pan discharge opening, and means for operating the cylinder, conveyer and blower, a member extending longitudinally across the lower mouth end of the pan and over the adjacent top part of the stripping cylinder to restrict the air intake passage to the front of the cylinder.

9. In a grain gathering apparatus, a grain pan having a conveyer pocket or depression in its bottom and having a mouth in its front, and a discharge opening in its back, a stripping cylinder in the mouth of the pan, a conveyer in the depression of the pan for concentrating the material adjacent to the discharge opening, a suction blower having its entrance in communication with the pan discharge opening, and means for operating the cylinder, conveyer and blower, a member extending longitudinally across the lower mouth end of the pan and over the adjacent top part of the stripping cylinder to restrict the air intake passage to the front of the cylinder, said member comprising a board whose under face adjacent to the cylinder is formed to conform to the periphery of the cylinder.

10. In a grain gathering apparatus, a grain pan having a conveyer pocket or depression in its bottom and having a mouth in its front, and a discharge opening in its back, a stripping cylinder in the mouth of the pan, a conveyer in the depression of the pan for concentrating the material adjacent to the discharge opening, a suction blower having its entrance in communication with the pan discharge opening, and means for operating the cylinder, conveyer and blower, a member extending longitudinally across the lower mouth end of the pan and over the adjacent top part of the stripping cylinder to restrict the air intake passage to the front of the cylinder, said member extending above the bottom of the pan to restrain the gathered grain against coming in contact with the stripping cylinder teeth on the downgoing side.

11. In a grain gathering apparatus, a grain pan having a conveyer pocket or depression in its bottom and having a mouth in its front, and a discharge opening in its back, a stripping cylinder in the mouth of the pan, a conveyer in the depression of the pan for concentrating the material adjacent to the discharge opening, a suction blower having its entrance in communication with the pan discharge opening, means for operating the cylinder, conveyer and blower, and means for restraining the gathered grain against coming in contact with the stripping cylinder on the downgoing side.

12. In a grain gathering apparatus, a grain pan having a conveyer pocket or depression in its bottom and having a mouth in its front, and a discharge opening in its back, a stripping cylinder in the mouth of the pan, a conveyer in the depression of the pan for concentrating the material adjacent to the discharge opening, a suction blower having its entrance in communication with the pan discharge opening, means for operating the cylinder, conveyer and blower, and means for restraining the gathered grain against coming in contact with the stripping cylinder on the downgoing side, said means comprising an abutment adjacent to the bottom edge of the pan at its mouth.

13. In a grain gathering apparatus, a grain pan having a conveyer pocket or depression in its bottom and having a mouth in its front, and a discharge opening in its back, a stripping cylinder in the mouth of the pan, a conveyer in the depression of the pan for concentrating the material adjacent to the discharge opening, a suction blower having its entrance in communication with the pan discharge opening, means for operating the cylinder, conveyer and blower, and an adjustable front member extending from the top mouth of the pan.

14. In a grain gathering apparatus, a grain pan having a conveyer pocket or depression in its bottom and having a mouth in its front, and a discharge opening in its back, a stripping cylinder in the mouth of the pan, a conveyer in the depression of the pan for concentrating the material adjacent to the discharge opening, a suction blower having its entrance in communication with the pan discharge opening, means for operating the cylinder, conveyer and blower, and a front plate hinged to the top mouth edge of the pan and extending downwardly therefrom in front of the stripping cylinder.

15. In a grain gathering apparatus, a grain pan having a conveyer pocket or depression in its bottom and having a mouth in its front, and a discharge opening in its back, a stripping cylinder in the mouth of the pan, a conveyer in the depression of the pan for concentrating the material adjacent to the discharge opening, a suction blower having its entrance in communication with the pan discharge opening, means for operating the cylinder, conveyer and blower, a front plate hinged to the top mouth edge of the pan and extending downwardly therefrom in front of the stripping cylinder, and a cross bar at the lower edge of said plate to engage the grain.

16. In a grain gathering apparatus, a grain pan having a conveyer pocket or depression in its bottom and having a mouth in its front, and a discharge opening in its back, a stripping cylinder in the mouth of the pan, a conveyer in the depression of the pan for concentrating the material adjacent to the discharge opening, a suction blower having its entrance in communication with the pan discharge opening, and means for operating the cylinder, conveyer and blower, end frames for the pan having bearings for the cylinder and conveyer shafts.

17. In a grain gathering apparatus, a grain pan having a conveyer pocket or depression in its bottom and having a mouth in its front, and a discharge opening in its back, a stripping cylinder in the mouth of the pan, a conveyer in the depression of the pan for concentrating the material adjacent to the discharge opening, a suction blower having its entrance in communication with the pan discharge opening, means for operating the cylinder, conveyer and blower, and end frames for the pans, each of said frames including a member having a nose extending beyond the front edge of the pan.

18. In a grain gathering mechanism, the combination with a suction blower, a stripping cylinder and a gathering pan; of means for preventing the contents of the pan from coming in contact with the downwardly traveling teeth of the cylinder.

19. In a grain gathering mechanism, the combination with a suction blower, a stripping cylinder and a gathering pan; of means for preventing the contents of the pan from coming in contact with the downwardly traveling teeth of the cylinder, and an adjustable member extending longitudinally across the upper mouth edge of the pan and hinged thereto.

20. In a grain gathering mechanism, the combination with supporting arms and a main supporting angle-iron carried thereby; of a grain pan, blower and stripping cylinder mechanism mounted thereon.

21. In a grain gathering mechanism, supporting arms and a main supporting angle-iron carried thereby, a grain pan mounted on said angle-iron and arms, a supporting strap carried by said angle-iron, a blower held by said strap against the rear of said grain pan, said pan having a discharge throat communicating with the intake of the blower, a conveyer screw for feeding the contents of the pan to the throat, said conveyer screw being spaced away from the throat, said pan having a baffle above and to the rear of the conveyer screw for directing the incoming grain to the conveyer screw, said pan having a mouth, a stripping cylinder mounted adjacent to the mouth and means for concentrating the suction on the upgoing or intake side of the stripping cylinder.

22. In a grain gathering mechanism, a grain pan, a blower secured to the back of the grain pan, said grain pan having a discharge opening communicating with the intake of the blower, a conveyer screw for feeding the gathered material to the throat of said pan, said conveyer screw being spaced away from the throat, said pan having a baffle for directing the incoming grain to the conveyer, said pan having a mouth, a stripping cylinder mounted in the mouth and means for concentrating the suction in front of the stripping cylinder at the upgoing side of the same.

23. In a grain gathering mechanism, a grain pan, a blower secured to the back of the grain pan, said grain pan having a discharge opening communicating with the intake of the blower, a conveyer screw for feeding the gathered material to the throat of said pan, said conveyer screw being spaced away from the throat, said pan having a baffle for directing the incoming grain to the conveyer, said pan having a mouth, a stripping cylinder mounted in the mouth and means for concentrating the suction in front of the stripping cylinder at the upgoing side of the same, and means for restraining the gathered grain against coming in contact with the stripping cylinder teeth on the downgoing side.

24. In a grain gathering mechanism, a gathering pan having a depressed bottom, a right and left conveyer screw mounted in the depressed bottom, said pan having an upright rear wall provided with a discharge opening, said conveyer screw having tossing fingers adjacent to the discharge opening of the pan, said pan having a mouth, a stripping cylinder mounted in the mouth of the pan, the top wall of the pan above the stripping cylinder being concaved to deflect the material toward the rear of the pan, a baffle at the rear of the pan for deflecting the material downwardly into the range of operation of the conveyer screw and tossing fingers.

25. In a grain gathering mechanism, a gathering pan having a depressed bottom, a right and left conveyer screw mounted in the depressed bottom, said pan having an upright rear wall provided with a discharge opening, said conveyer screw having tossing fingers adjacent to the discharge opening of the pan, said pan having a mouth, a stripping cylinder mounted in the mouth of the pan, the top wall of the pan above the stripping cylinder being concaved to deflect the material toward the rear of the pan, a baffle at the rear of the pan for deflecting the material downwardly into the range of operation of the conveyer screw and tossing fingers, said pan having a receiving chamber above the conveyer screw and mouth of the pan, the top of the pan having an opening extending across the same, and a cover for said opening.

26. In a grain gathering mechanism, a gathering pan having a depressed bottom, a right and left conveyer screw mounted in the depressed bottom, said pan having an upright rear wall provided with a discharge opening, said conveyer screw having tossing fingers adjacent to the discharge opening of the pan, said pan having a mouth, a stripping cylinder mounted in the mouth of the pan, the top wall of the pan above the stripping cylinder being concaved to deflect the material toward the rear of the pan, a baffle at the rear of the pan for deflecting the material downwardly into the range of operation of the conveyer screw and tossing fingers, a hinged extension plate secured to the pan at the upper mouth edge of the same and means for concentrating the suction at the front of the stripping cylinder and restraining the gathered material against coming in contact with the stripping cylinder teeth on the downgoing side.

27. In a grain gathering mechanism, a gathering pan having a depressed bottom, a right and left conveyer screw mounted in the depressed bottom, said pan having an upright rear wall provided with a discharge opening, said conveyer screw having tossing fingers adjacent to the discharge opening of the pan, said pan having a mouth, a stripping cylinder mounted in the mouth of the pan, the top wall of the pan above the stripping cylinder being concaved to deflect the material toward the rear of the pan, a baffle at the rear of the pan for deflecting the material downwardly into the range of operation of the conveyer screw and tossing fingers, a hinged extension plate secured to the pan at the upper mouth edge of the same, means for concentrating the suction at the front of the stripping cylinder and restraining the gathered material against coming in contact with the stripping cylinder teeth on the downgoing side, and means for adjusting the position of said hinged extension plate substantially as shown and for the purposes described.

GEORGE SCHAEFER.